US011958470B2

(12) United States Patent
Yuge

(10) Patent No.: US 11,958,470 B2
(45) Date of Patent: Apr. 16, 2024

(54) VEHICLE CONTROL DEVICE

(71) Applicant: MITSUBISHI JIDOSHA KOGYO KABUSHIKI KAISHA, Tokyo (JP)

(72) Inventor: Katsunori Yuge, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 513 days.

(21) Appl. No.: 17/312,316

(22) PCT Filed: Dec. 10, 2019

(86) PCT No.: PCT/JP2019/048266
§ 371 (c)(1),
(2) Date: Jun. 9, 2021

(87) PCT Pub. No.: WO2020/122060
PCT Pub. Date: Jun. 18, 2020

(65) Prior Publication Data
US 2022/0024440 A1 Jan. 27, 2022

(30) Foreign Application Priority Data
Dec. 10, 2018 (JP) ................................ 2018-230648

(51) Int. Cl.
*B60W 20/14* (2016.01)
*B60K 6/445* (2007.10)
(Continued)

(52) U.S. Cl.
CPC ............ *B60W 20/14* (2016.01); *B60K 6/445* (2013.01); *B60W 10/02* (2013.01); *B60W 10/08* (2013.01);
(Continued)

(58) Field of Classification Search
CPC ...... B60W 20/14; B60W 10/08; B60W 20/40; B60W 2510/107; B60K 6/445
See application file for complete search history.

(56) References Cited

U.S. PATENT DOCUMENTS

| 10,336,176 B2* | 7/2019 | Tsukamoto ........... B60W 10/02 |
| 2017/0158043 A1* | 6/2017 | Tsukamoto ............ B60K 6/442 |

FOREIGN PATENT DOCUMENTS

| CN | 105365813 A  * | 3/2016 | .......... B60L 15/2054 |
| JP | 4345593 B2 | 10/2009 | |

OTHER PUBLICATIONS

International Search Report for PCT/JP2019/048266 (PCT/ISA/210) dated Mar. 3, 2020.
(Continued)

*Primary Examiner* — Faye M Fleming
(74) *Attorney, Agent, or Firm* — Birch, Stewart, Kolasch & Birch, LLP

(57) ABSTRACT

A vehicle control device includes a motor, a transmission unit, a temperature sensor that detects a temperature of the motor, a vehicle speed sensor that detects a vehicle speed, and a controller. The controller controls switching of the transmission unit based on a first temperature determined in accordance with the vehicle speed as the temperature at which the transmission unit is switched from connection to disconnection, and a second temperature determined in accordance with the vehicle speed as the temperature at which the transmission unit is switched from the disconnection to the connection. The first temperature decreases as the vehicle speed increases. The controller switches the transmission unit from the connection to the disconnection based on the first temperature, and then switches the transmission unit from the disconnection to the connection based on the second temperature.

10 Claims, 5 Drawing Sheets

(51) Int. Cl.
*B60W 10/02* (2006.01)
*B60W 10/08* (2006.01)
*B60W 10/107* (2012.01)
*B60W 10/26* (2006.01)
*B60W 20/40* (2016.01)

(52) U.S. Cl.
CPC .......... *B60W 10/107* (2013.01); *B60W 10/26* (2013.01); *B60W 20/40* (2013.01); *B60W 2510/107* (2013.01); *B60W 2510/244* (2013.01); *B60W 2710/021* (2013.01)

(56) References Cited

OTHER PUBLICATIONS

Written Opinion of the International Searching Authority for PCT/JP2019/048266 (PCT/ISA/237) dated Mar. 3, 2020.

\* cited by examiner

VEHICLE CONTROL DEVICE

TECHNICAL FIELD

The present disclosure relates to a vehicle control device.

BACKGROUND ART

In a vehicle such as a hybrid vehicle or an electric automobile that travels on a driving force of a motor, for example, as shown in JP4345593B2, a clutch is provided between the motor and wheels. By connecting the clutch, a rotational force of the motor is transmitted to the wheels to drive the vehicle, and meanwhile a rotational force of the wheels is transmitted to the motor to recover regenerative energy (with reference to, for example, paragraphs 0017 to 0020, FIG. 5, and the like in JP4345593B2. When a vehicle speed reaches a maximum rotation speed of the motor or a temperature of the motor reaches a predetermined upper limit temperature, the clutch is disconnected to prevent an excessive load from acting on the motor.

In order to maximize a function of the motor, the upper limit rotation speed of the motor is set based on a temperature of the motor in the configuration according to JP4345593B2. Further, when the motor rotation speed obtained based on the vehicle speed reaches the upper limit rotation speed at each temperature, the clutch is controlled to be brought into a disconnected state. By controlling an operation of the clutch in this way, excessive rotation of the motor is prevented, and a movable range of the motor is expanded, so that power performance and fuel consumption performance of the vehicle can be improved (for example, with reference to paragraph 0014 and the like in JP4345593B2).

However, in a configuration in which the upper limit rotation speed is set based on the temperature of the motor as disclosed in JP4345593B2, the motor is controlled to operate at a rotation speed as high as possible, so that the temperature of the motor is likely to be always high. For this reason, in order to protect the motor, a time to disconnect the clutch increases, which may be disadvantageous in terms of efficient regeneration operation.

The regeneration operation during traveling of the vehicle will be described with reference to FIG. 7. The vehicle is configured such that the rotational force of the motor is applied to wheels so as to apply the driving force, and meanwhile the rotational force of the wheels is applied to the motor so as to recover the regenerative energy. The clutch provided between the motor and the wheels is normally in a connected state. When a vehicle speed V is increased due to an acceleration operation of a driver, the temperature of the motor is also increased accordingly. Here, a stator temperature T is adopted as a representative value of the temperature of the motor. When the stator temperature T exceeds a predetermined upper limit temperature $T_{max}$ of the motor as a temperature at which the clutch is switched from the connected state to the disconnected state, the clutch is switched to the disconnected state (time $t_1$). The upper limit temperature $T_{max}$ is a constant temperature that is not related to the vehicle speed V. For example, the upper limit temperature $T_{max}$ is set to 120° C., which is a maximum temperature at which a stable operation of the motor is guaranteed.

When the clutch is brought into the disconnected state, rotation of the wheels is not transmitted to the motor, so that the stator temperature T gradually decreases after an overshoot in which the temperature slight increases. Further, when the stator temperature T falls below a predetermined lower limit temperature $T_{min}$ as a temperature at which the clutch is switched from the disconnected state to the connected state, the clutch is switched to the connected state (time $t_3$). The lower limit temperature $T_{min}$ is set to a temperature lower than the upper limit temperature $T_{max}$ (for example, when the upper limit temperature $T_{max}$ is 120° C., the lower limit temperature $T_{min}$ is 110° C.).

On the other hand, when the acceleration operation of the driver is shifted to a deceleration operation (time $t_2$), the vehicle gradually decelerates. At this time, it is preferable to start the recovery of the regenerative energy at the same time as the deceleration is started in terms of regeneration efficiency. However, since the stator temperature T exceeds the lower limit temperature $T_{min}$ at the start of the deceleration, the clutch cannot be brought into the connected state. For this reason, regenerative energy to be recovered when the clutch is engaged cannot be recovered during a period from the start of deceleration to the connection of the clutch (from time $t_2$ to time $t_3$), which causes a decrease in regeneration efficiency. In particular, the regenerative energy is supposed to be recovered with high efficiency in a region where the vehicle speed V is high, but the regenerative energy cannot be recovered in the region where the vehicle speed V is high, which causes a particularly large loss in terms of the regeneration efficiency.

SUMMARY

Embodiments of the present disclosure relate to efficiently recovering regenerative energy by a motor.

According to an embodiment of the present disclosure, a control device controls a vehicle including: a motor configured to drive the vehicle and perform a regeneration; and a transmission unit provided between the motor and a wheel of the vehicle and that connects and disconnects a transmission of a rotational force. The control device includes: a temperature sensor that detects a temperature of the motor; a vehicle speed sensor that detects a speed of the vehicle; and a controller that switches between a connection and a disconnection in the transmission unit, based on the temperature detected by the temperature sensor and the speed of the vehicle detected by the vehicle speed sensor. The controller controls a switching of the transmission unit based on a first temperature determined in accordance with the speed as the temperature at which the transmission unit is switched from the connection to the disconnection, and a second temperature determined in accordance with the speed as the temperature at which the transmission unit is switched from the disconnection to the connection. The first temperature decreases as the speed of the vehicle increases. The controller switches the transmission unit from the connection to the disconnection based on the first temperature, and then switches the transmission unit from the disconnection to the connection based on the second temperature.

According to another embodiment of the present disclosure, the controller controls the switching of the transmission unit based on a third temperature higher than the second temperature at the same speed of the vehicle, the third temperature being determined in accordance with the speed as the temperature at which the transmission unit is switched from the disconnection to the connection, applies the second temperature when the switching of the transmission unit in a state where the vehicle is not decelerating, and applies the third temperature instead of the second temperature when the switching of the transmission unit in a state where the vehicle is decelerating.

According to another embodiment of the present disclosure, the controller applies the third temperature instead of the second temperature when the switching of the transmission unit, in a state where the regeneration is required for the motor.

According to another embodiment of the present disclosure, the control device further includes a brake sensor that detects a stepping amount of a driver on a brake pedal of the vehicle. The controller determines that the regeneration is required when a stepping amount on the brake pedal detected by the brake sensor is equal to or greater than a predetermined threshold.

According to another embodiment of the present disclosure, the third temperature is set to be higher than the second temperature, as the stepping amount on the brake pedal detected by the brake sensor becomes greater.

According to another embodiment of the present disclosure, the vehicle control device further includes a charge amount sensor that detects a charge amount of a battery serving as a power supply source of the motor. The controller controls the switching of the transmission unit based on a fourth temperature determined in accordance with the speed as the temperature at which the transmission unit is switched from the connection to the disconnection, and applies the fourth temperature instead of the first temperature when the switching of the transmission unit in a state where the charge amount detected by the charge amount sensor is equal to or smaller than a predetermined threshold. The fourth temperature is equal to or lower than the first temperature and equal to or higher than the second temperature at the same speed of the vehicle.

According to another embodiment of the present disclosure, a vehicle includes a motor configured to drive the vehicle and perform a regeneration, a transmission unit provided between the motor and a wheel of the vehicle and that connects and disconnects a transmission of a rotational force, and a control device configured to control the transmission unit. A control method for controlling the above vehicle in which the control device includes a temperature sensor that detects a temperature of the motor, a vehicle speed sensor that detects a speed of the vehicle, and a controller that switches between a connection and a disconnection in the transmission unit, based on the temperature detected by the temperature sensor and the speed of the vehicle detected by the vehicle speed sensor, includes: detecting the temperature of the motor by the temperature sensor; detecting the speed of the vehicle by the vehicle speed sensor; switching, by the controller, the transmission unit from the connection to the disconnection, based on a first temperature determined in accordance with the speed; and switching, by the controller, the transmission unit from the connection to the disconnection based on the first temperature, and then switching the transmission unit from the disconnection to the connection based on a second temperature determined in accordance with the speed. The first temperature decreases as the speed of the vehicle increases.

According to the present disclosure, the vehicle control device includes a motor, a clutch provided between the motor and a wheel of a vehicle, a temperature sensor that detects a temperature of the motor, a vehicle speed sensor that detects a speed of the vehicle, and a controller that switches the clutch between a connected state and a disconnected state. The controller holds a control map having a disconnection temperature threshold determined for each vehicle speed as a temperature at which the clutch is switched from the connected state to the disconnected state and a reconnection temperature threshold determined for each vehicle speed as a temperature at which the clutch is switched from the disconnected state to the connected state. The disconnection temperature threshold is set to decrease as the vehicle speed increases. The reconnection temperature threshold is set to a temperature equal to or lower than the disconnection temperature threshold at the same vehicle speed. Since the clutch is switched between the connected state and the disconnected state based on the temperature and the vehicle speed, in the high speed region, the clutch is brought into the disconnected state early, and the temperature rise of the motor can be controlled. Therefore, the clutch can be smoothly reconnected particularly in a high speed region where the regeneration efficiency is high, and the recovery of the regenerative energy by the motor can be efficiently performed.

DESCRIPTION OF EMBODIMENTS

Figure 1:
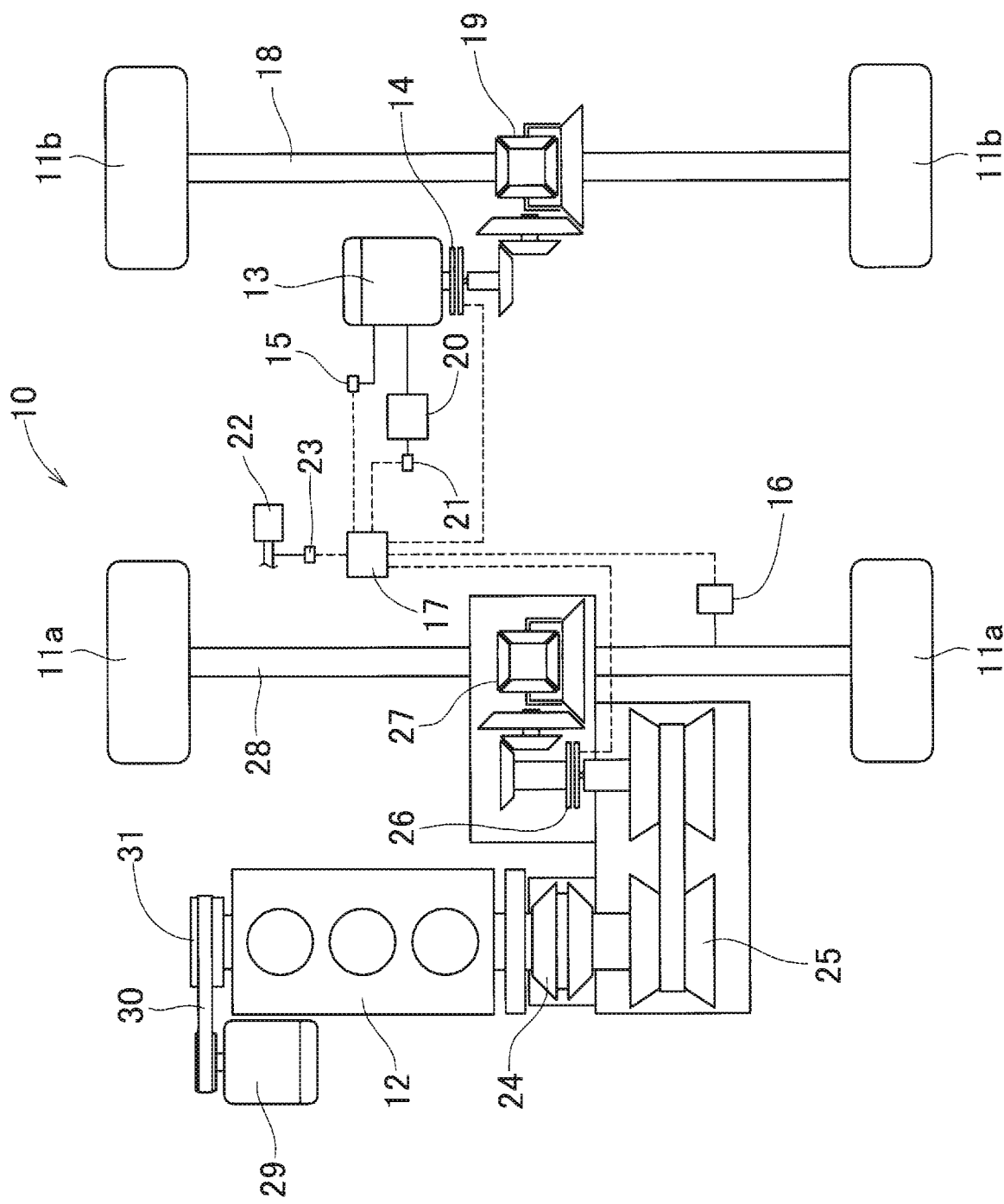
FIG. 1 is a schematic diagram showing an example of a vehicle on which a vehicle control device according to an embodiment of the present disclosure is mounted.

FIG. 1 shows an example of a vehicle 10 on which a vehicle control device according to an embodiment of the present disclosure is mounted. The vehicle 10 is a four-wheel drive mild hybrid vehicle in which front wheels 11a are driven by a driving force of an engine 12 and rear wheels (wheels) 11b are driven by a force (assist force) generated by a motor 13 (hereinafter referred to as main motor 13). The vehicle control device mounted on the vehicle 10 is intended to efficiently recover regenerative energy by the main motor 13. The vehicle control device includes, as main components, the main motor 13, a clutch 14 (hereinafter, referred to as main clutch 14), a temperature sensor 15, a vehicle speed sensor 16, and a controller 17.

The main motor 13 is provided side by side with a rear wheel-side axle 18 that drives the rear wheels 11b. The main motor 13 applies a rotational force to the rear wheels 11b during power running to assist the driving force of the engine 12. The assist force is transmitted to the rear wheel-side axle 18 via the main clutch 14 and a rear wheel-side differential 19. Meanwhile, the main motor 13 recovers regenerative energy (hereinafter referred to as regenerative power) from a rotational force of the rear wheels 11b during braking. Since the main motor 13 is directly coupled to the rear wheel-side axle 18 via a gear having a small transmission loss, the high regeneration efficiency can be obtained.

The main clutch 14 has a function of being switched between a connected state in which a rotational force can be transmitted between the main motor 13 and the rear wheels 11b via the rear wheel-side differential 19 and the rear wheel-side axle 18, and a disconnected state in which the transmission is disconnected. The main clutch 14 is normally in the connected state. The rear wheel-side differential 19 has a function of distributing the assist force related to driving from the main motor 13 to the left and right rear wheels 11b according to rotational resistance of the left and right rear wheels 11b.

When the main clutch 14 is brought into the connected state, the assist force related to driving is transmitted from the main motor 13 to the rear wheels 11b during power running, while the rotational force of the rear wheels 11b is transmitted to the main motor 13 during braking, and regenerative power is recovered by the main motor 13. A battery 20 mounted on the vehicle 10 is charged with the regenerative power. When the main clutch 14 is brought into the disconnected state, since the main motor 13 and the rear wheels 11b are brought into a separated state, the regenerative power cannot be recovered by the main motor 13 during braking.

The battery 20 is provided with a charge amount sensor 21 that detects a charge amount of the battery 20. Information on the charge amount of the battery 20 detected by the charge amount sensor 21 is sent to the controller 17.

The temperature sensor 15 is provided side by side with the main motor 13, and has a function of detecting a temperature of the main motor 13. Here, the stator temperature T is adopted as the representative value of the temperature of the main motor 13, but other temperatures such as a temperature of a housing of the main motor 13 and a temperature of lubricating oil flowing in a vicinity of the main motor 13 can be appropriately adopted as the representative value of the temperature of the main motor 13. Temperature information (stator temperature T) of the main motor 13 detected by the temperature sensor 15 is sent to the controller 17.

The vehicle speed sensor 16 has a function of detecting a speed of the vehicle 10. Vehicle speed information detected by the vehicle speed sensor 16 is sent to the controller 17. A position of the vehicle speed sensor 16 shown in FIG. 1 is an example, and the attachment position can be changed as appropriate.

The controller 17 includes a control map having a disconnection temperature threshold (first temperature) $T_{OFF}$ is determined, for each vehicle speed V, as a temperature at which the main clutch 14 is switched from the connected state to the disconnected state, a reconnection temperature threshold (second temperature) $T_{ON}$ that is determined, for each vehicle speed, as a temperature at which the main clutch 14 is switched from the disconnected state to the connected state, and a regeneration reconnection temperature threshold (third temperature) $T'_{ON}$ that is determined, for each vehicle speed, as a temperature at which the main clutch 14 is switched from the disconnected state to the connected state during the regeneration operation. Further, the main clutch 14 has a function of being switched between the connected state and the disconnected state based on the temperature detected by the temperature sensor 15 and the vehicle speed V detected by the vehicle speed sensor 16.

A brake pedal 22 is provided with a brake sensor 23 that detects a stepping force on the brake pedal 22 by a driver (a stepping amount of the driver on the brake pedal 22). Brake information detected by the brake sensor 23 is sent to the controller 17.

An example of the control map is shown in Table 1. The disconnection temperature threshold $T_{OFF}$ is set to decrease as the vehicle speed V increases. The reconnection temperature threshold $T_{ON}$ is set to be lower than the disconnection temperature threshold $T_{OFF}$ at the same vehicle speed V by 10° C. The reconnection temperature threshold $T_{ON}$ can be changed as appropriate within a range equal to or less than the disconnection temperature threshold $T_{OFF}$ at the same vehicle speed V. The regeneration reconnection temperature threshold $T'_{ON}$ is set to be higher than the reconnection temperature threshold $T_{ON}$ at the same vehicle speed V by 5° C. The regeneration reconnection temperature threshold $T'_{ON}$ can be changed as appropriate within a range higher than the reconnection temperature threshold $T_{ON}$ at the same vehicle speed V.

The regeneration reconnection temperature threshold $T'_{ON}$ can be set to a temperature equal to or higher than the disconnection temperature threshold $T_{OFF}$ as long as the regeneration reconnection temperature threshold $T'_{ON}$ does not exceed the upper limit temperature of the main motor 13 (a maximum temperature at which the stable operation of the main motor 13 is guaranteed, and may be set to 120° C., for example) in order to further improve the regeneration efficiency in the regeneration operation. The regeneration reconnection temperature threshold $T'_{ON}$ can be set to a constant temperature (for example, 115° C.) regardless of the vehicle speed V.

TABLE 1

| Vehicle Speed V [km/h] | Disconnection Temperature Threshold $T_{OFF}$ [° C.] | Reconnection Temperature Threshold $T_{ON}$ [° C.] | Regeneration Reconnection Temperature Threshold $T'_{ON}$ [° C.] |
| --- | --- | --- | --- |
| 0 | 120 | 110 | 115 |
| 50 | 120 | 110 | 115 |
| 70 | 115 | 105 | 110 |
| 80 | 110 | 100 | 105 |
| 100 | 110 | 100 | 105 |

The driving force of the engine 12 is transmitted, via a torque converter 24, a continuous variable transmission 25, an auxiliary clutch 26, and a front wheel-side differential 27, to a front wheel-side axle 28 that drives the front wheels 11a. The torque converter 24 has a function of transmitting the driving force of the engine 12 to the continuous variable transmission 25. The auxiliary clutch 26 has a function of being switched between a connected state in which the driving force can be transmitted between the engine 12 and the front wheels 11a and a disconnected state in which the transmission is disconnected. The front wheel-side differential 27 has a function of distributing the driving force from the engine 12 to the left and right front wheels 11a according to rotational resistance of the left and right front wheels 11a.

The engine 12 is provided side by side with an auxiliary motor 29. The auxiliary motor 29 is directly coupled to a crankshaft 31 of the engine 12 by a belt 30, is mainly used for starting the engine 12, and can recover regenerative power during braking by bring the auxiliary clutch 26 into the connected state. The auxiliary motor 29 is co-rotated by the crankshaft 31 during the operation of the engine 12.

Figure 2:
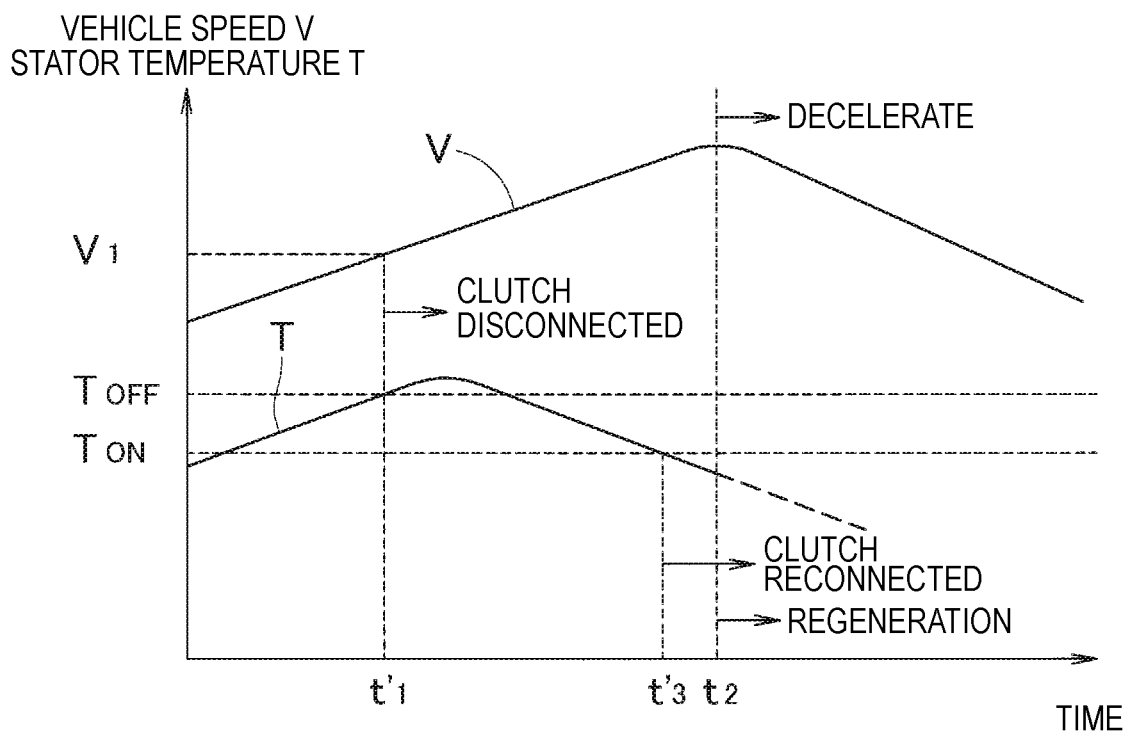
FIG. 2 is a diagram showing a regeneration operation during traveling of a vehicle (a first example of the present disclosure).

A first example of the regeneration operation during traveling of the vehicle 10 (with reference to FIG. 1) when the above-described control map is applied will be described with reference to FIG. 2. When the vehicle speed V is increased due to the acceleration operation of the driver, the temperature (stator temperature T) of the stator constituting the main motor is also increased accordingly. When the stator temperature T exceeds the disconnection temperature threshold $T_{OFF}$ at a certain vehicle speed $V_1$, the main clutch 14 is switched to the disconnected state (time $t'_1$).

In the control map shown in Table 1, the disconnection temperature threshold $T_{OFF}$ lower than the upper limit temperature (120° C.) of the main motor 13 is set in a high speed region where the vehicle speed V is 70 km/hour or more. Therefore, as compared with a case where the clutch is uniformly switched to the disconnected state at the upper limit temperature of the motor regardless of the vehicle speed as in the related art, the main clutch 14 is brought into the disconnected state earlier in the high speed region, and a temperature rise of the main motor 13 can be controlled.

When the main clutch 14 is brought into the disconnected state, the rotation of the rear wheels 11b is not transmitted to the main motor 13, so that the stator temperature T gradually decreases after an overshoot in which the temperature (stator temperature T) slightly increases from the disconnection temperature threshold $T_{OFF}$. When the stator temperature T falls below the reconnection temperature threshold $T_{ON}$, the main clutch 14 is switched to the connected state (time $t'_3$).

When the acceleration operation of the driver or a constant speed traveling operation is shifted to a deceleration operation (time $t_2$), the vehicle 10 gradually decelerates. As described above, by bringing the main clutch 14 into the disconnected state earlier based on the disconnection temperature threshold $T_{OFF}$, the possibility that the main clutch 14 can be brought into the connected state at a start time point (time $t_2$) of the deceleration is increased. In this case, since the regenerative power can be recovered at the same time as the deceleration of the vehicle 10 is started, the regeneration efficiency can be improved.

Figure 3:
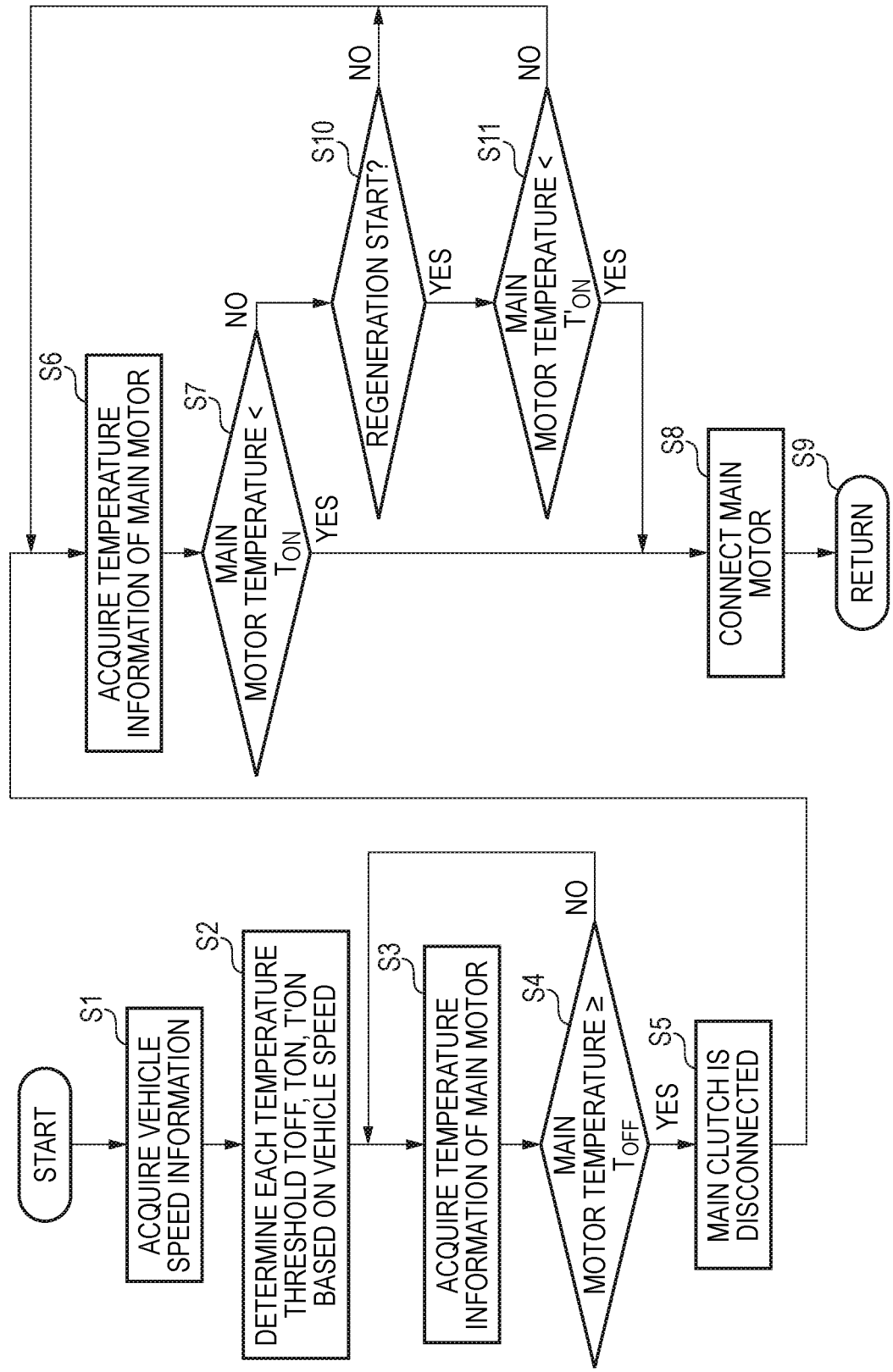
FIG. 3 is a flowchart showing a flow of control to be applied to the vehicle control device.

An example of a control flow to be applied to the vehicle control device will be described with reference to a flowchart shown in FIG. 3 with reference to reference numerals in FIG. 1.

First, the vehicle speed information is acquired by the vehicle speed sensor 16 (step S1). The disconnection temperature threshold $T_{OFF}$, the reconnection temperature threshold $T_{ON}$, and the regeneration reconnection temperature threshold $T_{ON}$ corresponding to the vehicle speed V are determined based on the vehicle speed information sent to the controller 17 and the control map (step S2). Next, the temperature information of the main motor 13 (stator temperature T in this embodiment) is acquired by the temperature sensor 15 (step S3).

Further, a high/low relationship between the temperature of the main motor 13 and the disconnection temperature threshold $T_{OFF}$ determined according to the vehicle speed V is compared (step S4). When the main motor temperature is equal to or higher than the disconnection temperature threshold $T_{OFF}$ (YES in step S4), the main clutch 14 is switched from the connected state to the disconnected state based on an operation signal from the controller 17 (step S5). When the main motor temperature is lower than the disconnection temperature threshold $T_{OFF}$ (NO in step S4), the temperature information of the main motor 13 is acquired again (step S3), and then the comparison of the high/low relationship between the main motor temperature and the disconnection temperature threshold $T_{OFF}$ is repeated (step S4).

When the main clutch 14 is switched to the disconnected state in the above, the temperature information of the main motor 13 is subsequently acquired by the temperature sensor 15 (step S6). Then, a high/low relationship between the main motor temperature and the reconnection temperature threshold $T_{ON}$ determined according to the vehicle speed V is compared (step S7). When the main motor temperature is lower than the reconnection temperature threshold $T_{ON}$ (YES in step S7), the main clutch 14 is switched from the disconnected state to the connected state based on an operation signal from the controller 17 (step S8), and a series of the control flow is exited (step S9).

On the other hand, when the main motor temperature is equal to or higher than the reconnection temperature threshold $T_{ON}$ (NO in step S7), it is determined whether the regenerative operation is required by the vehicle 10 (step S10). The determination is comprehensively made based on various factors such as the stepping force of the driver on the brake pedal 22, the vehicle speed V, and the like.

When it can be determined that the regeneration operation is started based on the requirement for regeneration (YES in step S10), a high/low relationship between the main motor temperature and the regeneration reconnection temperature threshold $T_{ON}$ determined according to the vehicle speed V is compared (step S11). When the main motor temperature is lower than the regeneration reconnection temperature threshold $T_{ON}$ (YES in step S11), the main clutch 14 is switched from the disconnected state to the connected state based on an operation signal from the controller 17 (step S8). Then, the series of the control flow is completed (step S9).

On the other hand, when it can be determined that the regeneration operation is not yet started (NO in step S10), or when the main motor temperature is equal to or higher than the regeneration reconnection temperature threshold $T_{ON}$ (NO in step S11), the temperature information of the main motor 13 is acquired again (step S6), and then the determination as to whether the regeneration operation is started (step S10) and the comparison of the high/low relationship between the main motor temperature and the regeneration reconnection temperature threshold $T_{ON}$ are repeated (step S11).

Figure 4:
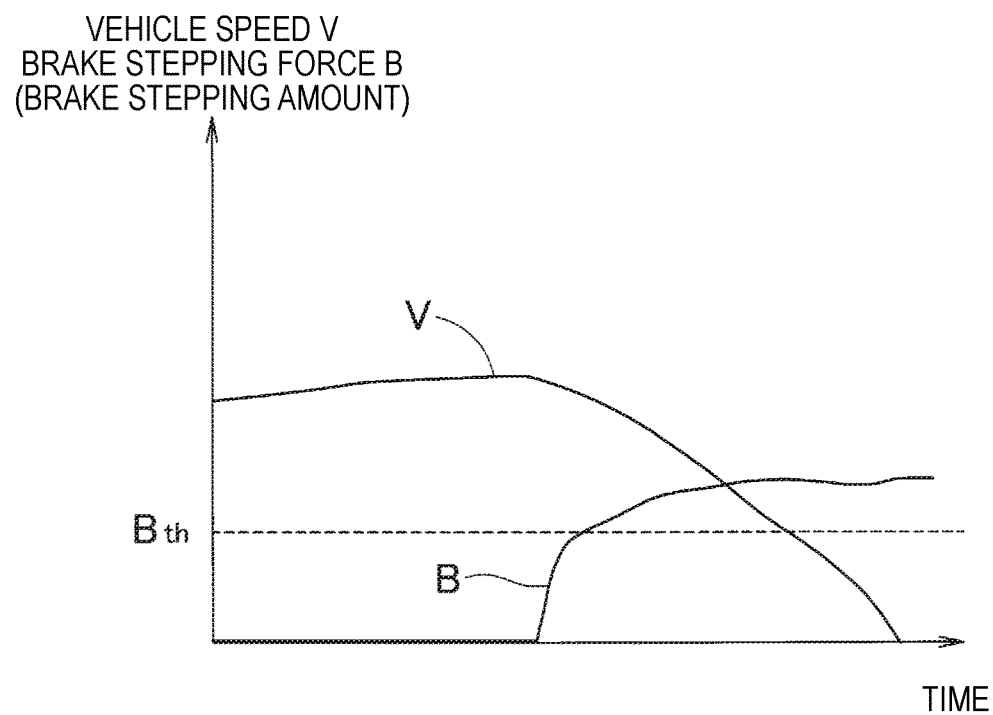
FIG. 4 is a diagram showing a time change in a braking force (in a case where a driver intends to stop the vehicle).
Figure 5:
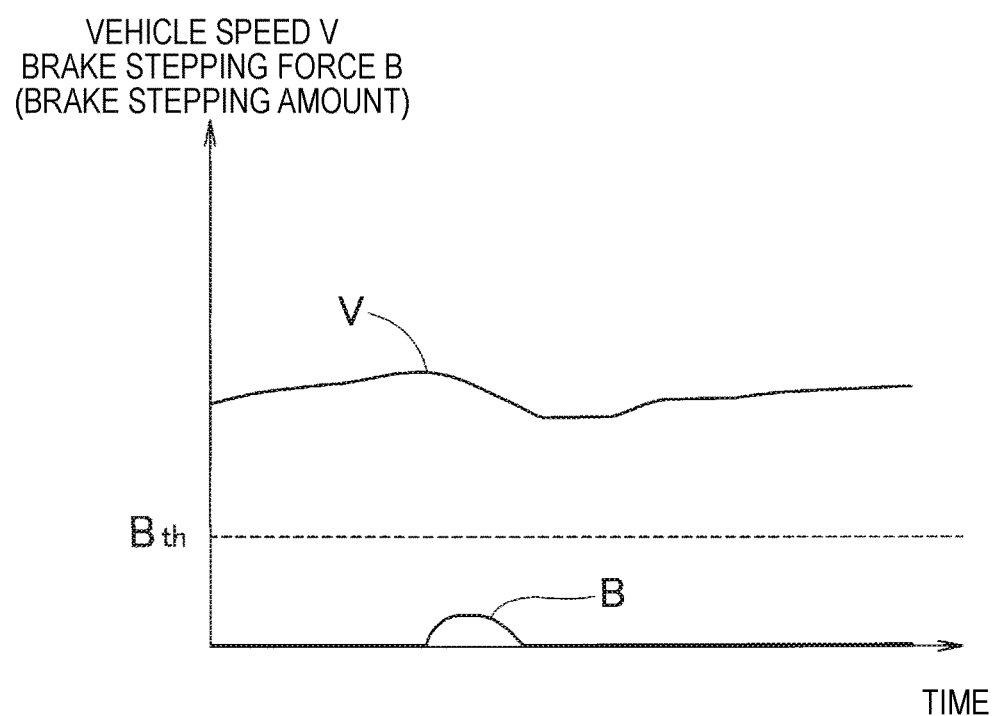
FIG. 5 is a diagram showing a temporal change in a braking force (in a case where the driver does not intend to stop the vehicle).

The determination as to whether the regeneration operation is started can be made based on, for example, the stepping force B of the driver on the brake pedal 22. For example, as shown in FIG. 4, when a stepping force B on the brake pedal 22 detected by the brake sensor 23 is larger than a threshold $B_{th}$, there is a high possibility that the driver has a clear intention of deceleration, and the regenerative operation can be started along with the deceleration. In contrast, as shown in FIG. 5, when the stepping force B on the brake pedal 22 is smaller than the threshold $B_{th}$, it can be said that the driver may perform an acceleration operation again, and it is not preferable to start the regeneration operation at this time point.

When the stepping force B on the brake pedal 22 is larger than the threshold $B_{th}$, an increment amount of the regeneration reconnection temperature threshold $T_{ON}$ with respect to the reconnection temperature threshold $T_{ON}$ can be increased as the stepping force B increases. In this way, there is a possibility that the regenerative power can be recovered more efficiently without impairing drivability.

The disconnection temperature threshold $T_{OFF}$ during switching of the main clutch 14 from the connected state to the disconnected state can also be changed according to the charge amount of the battery 20 detected by the charge amount sensor 21. When it can be determined that the charge amount of the battery 20 is insufficient (for example, a state of charge is 30%) with respect to when it can be determined that the battery 20 is in a state of being sufficiently charged (for example, the state of charge is 70%), for example, as shown in Table 2, a recovery disconnection temperature threshold (fourth temperature) $T'_{OFF}$ suitable for recovery of the charge amount of the battery 20 can be applied instead of the disconnection temperature threshold $T_{OFF}$ applied when the charge amount of the battery 20 is sufficient.

The recovery disconnection temperature threshold $T_{OFF}$ is set to a temperature equal to or lower than the disconnection temperature threshold $T_{OFF}$ and equal to or higher than the reconnection temperature threshold $T_{ON}$. By applying the recovery disconnection temperature threshold $T_{OFF}$ when the charge amount of the battery 20 is insufficient, the main clutch 14 is brought into the disconnected state earlier than usual. Then, the temperature rise of the main motor 13 is further controlled, and the reconnection of the main clutch 14 is performed at an earlier stage. Therefore, a recovery amount of the regenerative power is increased, and the charge amount of the battery 20 can be quickly recovered. A charge amount threshold (for example, 50%) for determining that the charge amount of the battery 20 is insufficient can be determined as appropriate.

TABLE 2

| Vehicle Speed V [km/h] | Disconnection Temperature Threshold $T_{OFF}$ [° C.] | Reconnection Temperature Threshold $T_{ON}$ [° C.] | Regeneration Reconnection Temperature Threshold $T'_{ON}$ [° C.] |
|---|---|---|---|
| 0 | 120 | 115 | 110 |
| 50 | 120 | 115 | 110 |
| 70 | 115 | 110 | 105 |
| 80 | 110 | 110 | 100 |
| 100 | 110 | 110 | 100 |

Figure 6:
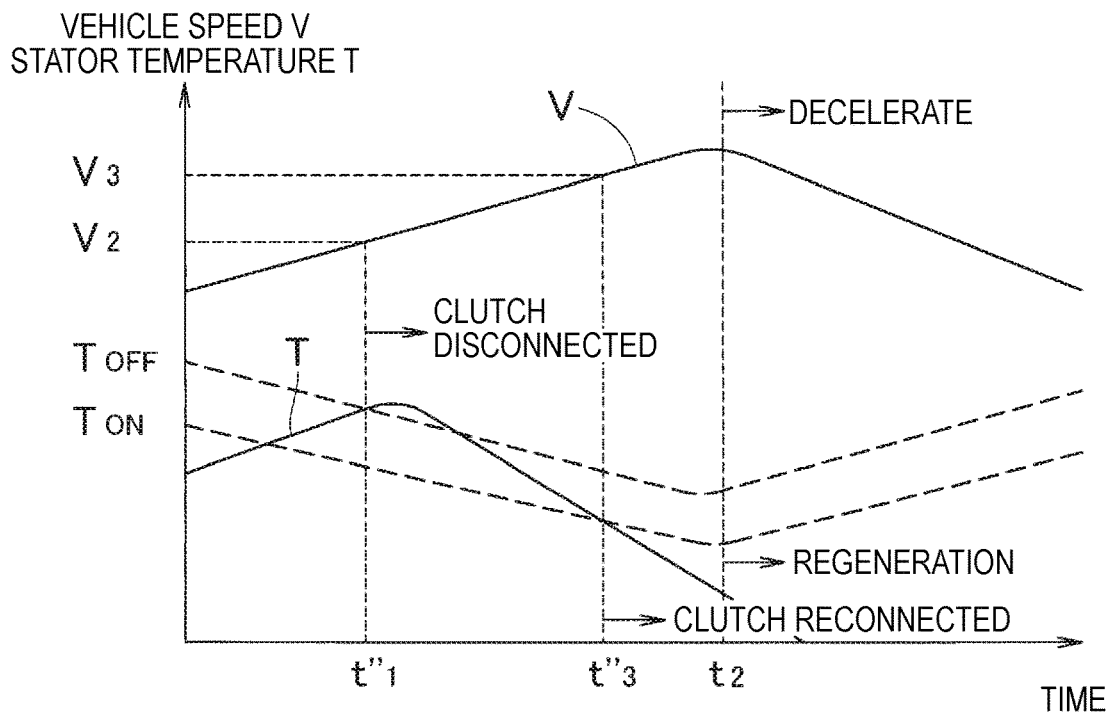
FIG. 6 is a diagram showing a regeneration operation during traveling of the vehicle (a second example of the present disclosure).
Figure 7:
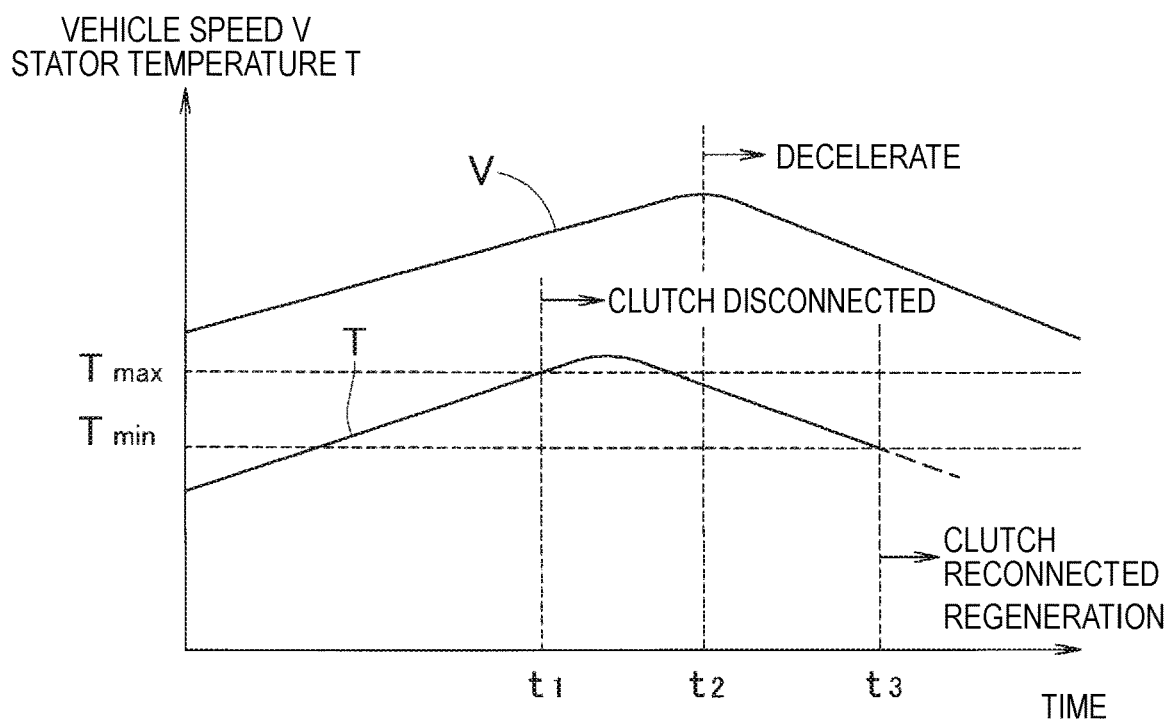
FIG. 7 is a diagram showing a regeneration operation during traveling of a vehicle (an example in the related art).

A second example of the regeneration operation during traveling of the vehicle 10 when the above-described control map is applied will be described with reference to FIG. 6. In the first example (with reference to FIG. 2), the reconnection temperature threshold $T_{ON}$ and the regeneration reconnection temperature threshold $T_{ON}$ are determined based on a vehicle speed $V_1$ (vehicle speed at the time of disconnection of the main clutch 14) corresponding to the disconnection temperature threshold $T_{OFF}$, but in the second example, each temperature threshold is determined based on the vehicle speed V at each time point during traveling of the vehicle 10. Specifically, the disconnection temperature threshold $T_{OFF}$ is determined based on a vehicle speed $V_2$, and the reconnection temperature threshold $T_{ON}$ is determined based on a vehicle speed $V_3$.

In the second example, as compared with the case where the clutch is uniformly switched to the disconnected state at the upper limit temperature of the motor regardless of the vehicle speed as in the related art, the main clutch 14 is also brought into the disconnected state earlier in the high speed region (time $t''_1$), so that the temperature rise of the main motor 13 can also be controlled. Therefore, the possibility that the main clutch 14 can be brought into the connected state at a time point (time $t''_3$) earlier than a start time point (time $t_2$) of the deceleration is increased, and the regeneration efficiency can be improved.

According to an aspect of the present invention, a control device controls a vehicle (10) including a motor (13) configured to drive the vehicle (10) and perform regeneration, and a transmission unit (14) provided between the motor (13) and a wheel (11b) of the vehicle (10) and configured to connect or disconnect transmission of a rotational force. The control device includes: a temperature sensor (15) configured to detect a temperature of the motor (13); a vehicle speed sensor (16) configured to detect a speed of the vehicle; and a controller (17) configured to switch between connection and disconnection in the transmission unit (14), based on a temperature detected by the temperature sensor (15) and a vehicle speed detected by the vehicle speed sensor (16). The controller (17) controls the switching of the transmission unit based on a first temperature ($T_{OFF}$) determined according to a vehicle speed as a temperature at which the transmission unit (14) is switched from the connection to the disconnection and a second temperature ($T_{ON}$) determined according to a vehicle speed as a temperature at which the transmission unit (14) is switched from the disconnection to the connection. The first temperature ($T_{OFF}$) decreases as the vehicle speed increases. The controller (17) switches the transmission unit (14) from the connection to the disconnection based on the first temperature ($T_{OFF}$), and then switches the transmission unit (14) from the disconnection to the connection based on the second temperature ($T_{ON}$).

The controller (17) controls the switching of the transmission unit (14) based on a third temperature ($T_{ON}$) higher than the second temperature ($T_{ON}$) at the same vehicle speed, the third temperature being determined according to a vehicle speed as a temperature at which the transmission unit (14) is switched from the disconnection to the connection, applies the second temperature ($T_{ON}$) when the switching of the transmission unit (14) in a state where the vehicle (10) is not decelerating, and applies the third temperature ($T'_{ON}$) instead of the second temperature ($T_{ON}$) when the switching of the transmission unit (14) in a state where the vehicle (10) is decelerating.

In a state where the regeneration is required for the motor (13), the controller (17) applies the third temperature ($T_{ON}$) instead of the second temperature ($T_{ON}$) when the switching of the transmission unit (14).

The control device further includes a brake sensor (23) configured to detect a stepping amount of a driver on a brake pedal (22) of the vehicle. The controller (17) determines that the regeneration is required when a stepping amount on the brake pedal (22) detected by the brake sensor (23) is equal to or greater than a predetermined threshold.

The third temperature ($T_{ON}$) is set to be higher than the second temperature ($T_{ON}$), as the stepping amount on the brake pedal (22) detected by the brake sensor (23) becomes greater.

The vehicle control device further includes a charge amount sensor (21) configured to detect a charge amount of a battery (20) serving as a power supply source of the motor (13). The controller (17) controls switching of the transmission unit (14) based on a fourth temperature ($T'_{OFF}$) determined according to a vehicle speed as a temperature at which the transmission unit (14) is switched from the connection to the disconnection, and applies the fourth temperature ($T'_{OFF}$) instead of the first temperature ($T_{OFF}$) when the switching of the transmission unit (14) in as state of the charge amount detected by the charge amount sensor (21) is equal to or smaller than a predetermined threshold. The fourth temperature ($T'_{OFF}$) is equal to or lower than the first temperature ($T_{OFF}$) and equal to or higher than the second temperature ($T_{ON}$) at the same vehicle speed.

A control method for controlling a vehicle (10) including a motor (13) configured to drive the vehicle (10) and perform regeneration, a transmission unit (14) provided between the motor (13) and a wheel (11b) of the vehicle (10) and configured to connect and disconnect transmission of a rotational force, and a control device configured to control the transmission unit (14) and including: a temperature sensor (15) configured to detect a temperature of the motor (13), a vehicle speed sensor (16) configured to detect a speed of the vehicle (10), and a controller (17) configured to switch between connection and disconnection in the transmission unit (14), based on a temperature detected by the temperature sensor (15) and a vehicle speed detected by the vehicle speed sensor (16), and the control method includes: detecting a temperature of the motor (13) by the temperature sensor (15); detecting a speed of the vehicle (10) by the vehicle speed sensor (16); switching, by the controller (17), the transmission unit (14) from connection to disconnection based on a first temperature ($T_{OFF}$) determined according to a vehicle speed; and switching, by the controller (17), the transmission unit (14) from the connection to the disconnection based on the first temperature ($T_{OFF}$), and then switching the transmission unit (14) from the disconnection to the connection based on a second temperature ($T_{ON}$) determined according to the speed. The first temperature ($T_{OFF}$) decreases as the vehicle speed increases.

The configuration of the vehicle control device, the control map, the flowchart of the control flow, and the like described above are merely examples for describing the present disclosure. Further, as long as the problem of the present disclosure that regenerative energy based on the motor 13 (the main motor 13) is efficiently recovered can be solved, the components, the control map, the control flow, and the like described above can be modified as appropriate.

In the above description, the clutch is used as a configuration for transmitting the rotational force of the motor to the wheels, but the clutch may be replaced with a transmission unit such as a planetary gear mechanism or a torque converter. As long as the problem of the present disclosure can be solved, the replaced configuration can be appropriately implemented based on the knowledge of those skilled in the art.

As described above, the vehicle 10 in which the main motor 13 of an axle direct-coupling type is provided only on a rear wheel 11b side has been described. However, the vehicle control device according to the present disclosure can also be applied to the vehicle 10 in which the main motor 13 is provided on both a front wheel 11a side and the rear wheel 11b side, or the vehicle 10 (two-wheel drive vehicle) in which the main motor 13 is provided only on the front wheel 11a side.

The present application is based on Japanese Patent Application No. 2018-230648 filed on Dec. 10, 2018, and the contents thereof are incorporated herein as reference.

REFERENCE SIGNS LIST

10: vehicle
11a: front wheel
11B: rear wheel (wheel)
12: engine
13: motor (main motor)
14: transmission unit (clutch, main clutch)
15: temperature sensor
16: vehicle speed sensor
17: controller
18: rear wheel-side axle
19: rear wheel-side differential
20: battery
21: charge amount sensor
22: brake pedal
23: brake sensor
24: torque converter
25: continuous variable transmission
26: auxiliary clutch
27: front wheel-side differential
28: front wheel-side axle
29: auxiliary motor
30: belt
31: crankshaft

The invention claimed is:

1. A controller that controls a vehicle including: a motor configured to drive the vehicle and perform a regeneration; and a transmission provided between the motor and a wheel of the vehicle and that connects and disconnects a transmission of a rotational force, the controller comprising:
    a temperature sensor that detects a temperature of the motor;
    a vehicle speed sensor that detects a speed of the vehicle; and
    a transmission controller that switches between a connection and a disconnection in the transmission, based on the temperature detected by the temperature sensor and the speed of the vehicle detected by the vehicle speed sensor,
    wherein the transmission controller controls a switching of the transmission based on a first temperature and a second temperature, the first temperature being determined in accordance with the speed as the temperature at which the transmission is switched from the connection to the disconnection, and the second temperature being determined in accordance with the speed as the temperature at which the transmission is switched from the disconnection to the connection,
    wherein the first temperature decreases as the speed of the vehicle increases, and
    wherein the transmission controller is configured to:
        switch the transmission from the connection to the disconnection based on the first temperature; and then
        switch the transmission from the disconnection to the connection based on the second temperature.

2. The controller according to claim 1,
wherein the transmission controller controls the switching of the transmission based on a third temperature higher than the second temperature at the same speed of the vehicle, the third temperature being determined in accordance with the speed as the temperature at which the transmission is switched from the disconnection to the connection, and
wherein the transmission controller applies the second temperature when the switching of the transmission in a state where the vehicle is not decelerating, and applies the third temperature instead of the second temperature when the switching of the transmission in a state where the vehicle is decelerating.

3. The controller according to claim 2,
wherein the transmission controller applies the third temperature instead of the second temperature when the switching of the transmission, in a state where the regeneration is required for the motor.

4. The controller according to claim 3 further comprising:
a brake sensor that detects a stepping amount of a driver on a brake pedal of the vehicle,
wherein the transmission controller determines that the regeneration is required when a stepping amount on the brake pedal detected by the brake sensor is equal to or greater than a predetermined threshold.

5. The controller according to claim 4,
wherein the third temperature is set to be higher than the second temperature, as the stepping amount on the brake pedal detected by the brake sensor becomes greater.

6. The controller according to claim 1 further comprising:
a charge amount sensor that detects a charge amount of a battery serving as a power supply source of the motor,
wherein the transmission controller controls the switching of the transmission based on a fourth temperature, the fourth temperature being determined in accordance with the speed as the temperature at which the transmission is switched from the connection to the disconnection,
wherein the transmission controller applies the fourth temperature instead of the first temperature when the switching of the transmission in a state where the charge amount detected by the charge amount sensor is equal to or smaller than a predetermined threshold, and
wherein the fourth temperature is equal to or lower than the first temperature and equal to or higher than the second temperature at the same speed of the vehicle.

7. The controller according to claim 2 further comprising:
a charge amount sensor that detects a charge amount of a battery serving as a power supply source of the motor,
wherein the transmission controller controls the switching of the transmission based on a fourth temperature, the fourth temperature being determined in accordance with the speed as the temperature at which the transmission is switched from the connection to the disconnection,
wherein the transmission controller applies the fourth temperature instead of the first temperature when the switching of the transmission in a state where the charge amount detected by the charge amount sensor is equal to or smaller than a predetermined threshold, and
wherein the fourth temperature is equal to or lower than the first temperature and equal to or higher than the second temperature at the same speed of the vehicle.

8. The controller according to claim 3 further comprising:
a charge amount sensor that detects a charge amount of a battery serving as a power supply source of the motor,
wherein the transmission controller controls the switching of the transmission based on a fourth temperature, the fourth temperature being determined in accordance with the speed as the temperature at which the transmission is switched from the connection to the disconnection,
wherein the transmission controller applies the fourth temperature instead of the first temperature when the switching of the transmission in a state where the charge amount detected by the charge amount sensor is equal to or smaller than a predetermined threshold, and
wherein the fourth temperature is equal to or lower than the first temperature and equal to or higher than the second temperature at the same speed of the vehicle.

9. The controller according to claim 4 further comprising:
a charge amount sensor that detects a charge amount of a battery serving as a power supply source of the motor,
wherein the transmission controller controls the switching of the transmission based on a fourth temperature, the fourth temperature being determined in accordance with the speed as the temperature at which the transmission is switched from the connection to the disconnection,
wherein the transmission controller applies the fourth temperature instead of the first temperature when the switching of the transmission in a state where the charge amount detected by the charge amount sensor is equal to or smaller than a predetermined threshold, and
wherein the fourth temperature is equal to or lower than the first temperature and equal to or higher than the second temperature at the same speed of the vehicle.

10. The controller according to claim 5 further comprising:
a charge amount sensor that detects a charge amount of a battery serving as a power supply source of the motor,
wherein the transmission controller controls the switching of the transmission based on a fourth temperature, the fourth temperature being determined in accordance with the speed as the temperature at which the transmission is switched from the connection to the disconnection,
wherein the transmission controller applies the fourth temperature instead of the first temperature when the switching of the transmission in a state where the charge amount detected by the charge amount sensor is equal to or smaller than a predetermined threshold, and
wherein the fourth temperature is equal to or lower than the first temperature and equal to or higher than the second temperature at the same speed of the vehicle.

\* \* \* \* \*